UNITED STATES PATENT OFFICE.

LUDWIG KAUFMANN, OF BERLIN, GERMANY.

ORGANIC ANTIMONY COMPOUNDS AND PROCESS OF MAKING SAME.

1,060,765.  Specification of Letters Patent.  Patented May 6, 1913.

No Drawing.  Application filed August 14, 1909. Serial No. 512,849.

*To all whom it may concern:*

Be it known that I, LUDWIG KAUFMANN, chemist, citizen of Germany, subject of the King of Bavaria and of the Emperor of Germany, residing at Berlin, in the Kingdom of Prussia and Empire of Germany, have invented new and useful Organic Antimony Compounds and Process of Making Same, of which the following is a specification.

The subject matter of my invention is a process of producing triphenylstibin sulfid, its homologues, and their derivatives. It also comprises the chemical compounds obtained thereby. These compounds readily tend to decompose or split by giving off their sulfur. They are to be used as therapeutical agents during employment. Experiments have shown that the sulfur split off in this manner and therefore acting "*in statu nascendi*" on the human body has a far more intensive action for instance against dermatoses than the usual sulfur containing medicaments. A decomposition being achieved in this sense can be observed in the triphenylstibin sulfid, discovered by me and having the formula $$(C_6H_5)_3SbS.$$

Michaelis and Reese have attempted to make this compound. See *Annalen der Chemie*, vol. 233, page 44 (year 1886). These authors thought at first that they could obtain the sulfid by introducing sulfureted hydrogen into the alcoholic ammoniacal solution of the triphenlystibin haloids, but as the result of their experiments they obtained only a reduction of the haloid compounds to triphenylstibin so that they were induced to give to the reaction the following equation:

$$(C_6H_5)_3SbCl_2 + H_2S = (C_6H_5)_3Sb + 2HCl + S.$$

But according to my observation the reaction by no means takes place in this simple manner. Namely, if the sulfureted hydrogen is introduced cautiously, white crystalline needles are firstly precipitated which do not melt together, as Michaelis and Reese state, but redissolve when more sulfureted hydrogen is introduced, the liquid simultaneously coloring an intense yellowish red. The crystals which first appear and which were taken by Michaelis and Reese for triphenylstibin are, according to analysis, nothing else than triphenylstibin sulfid, whereas, it is true, only triphenylstibin can be obtained from the yellowish red solution in accordance to the statements of these authors. In explaining the reaction which certainly occurs in several successive phases it must first be stated that in the alcoholic ammoniacal solution the chlorid as such is no longer present. On the other hand it can be shown that the solution contains the hydroxid $(C_6H_5)_3Sb(OH)_2$ or its alcoholate $(C_6H_5)_3Sb(OC_2H_5)_2$. If for simplicity it is supposed that the hydroxid is contained in the solution, the first phase of the sulfureted hydrogen action can be expressed by the following equation:

$$(C_6H_5)_3Sb(OH)_2 + H_2S = (C_6H_5)_3SbS + 2H_2O.$$

This transformation takes places quantitatively, and only when the antimony compound has been transformed into the sulfid difficultly soluble in alcohol and when more sulfureted hydrogen is introduced does dissolution take place, the commencement of which is very clearly characterized by the occurrence of a yellow coloration. Michaelis and Reese explained this coloration by assuming that the sulfur which in their opinion is split off (comp. the last formula but one) dissolves in the ammonium sulfid to ammonium poly-sulfid. This assumption is not correct because the yellow solution when left to itself becomes perfectly colorless after some time, sulfur being precipitated. Also, the decolorized solution yields no cupric sulfid with sulfate of copper. Consequently, the yellow coloration can only be attributed to the antimony compound formed from the sulfid and dissolved in alcohol. It has not been possible heretofore to isolate this compound from the solution. For the explanation of the dissolving process, however, it will scarcely be possible to take anything else into consideration than either—according to the analogy of the solubility of the sulfids of antimony in ammonium sulfid—the production of a sulfo salt:

$$(C_6H_5)_3SbS + NH_4SH = (C_6H_5)_3Sb\!<\!\genfrac{}{}{0pt}{}{SNH_4}{SH}$$

or the formation of a derivative of tetratomic sulfur, as *e. g.*

$$(C_6H_5)_3Sb\!:\!S\!:\!S\!<\!\genfrac{}{}{0pt}{}{NH}{H}$$

Obviously, the last formula recalls the type of diazo compounds, and indeed a somewhat far reaching analogy (color of the solutions, instability of the same, decomposition with splitting off of sulfur corresponding to the splitting off of nitrogen in the diazo compounds) is not to be denied. With regard to decomposition, this takes place when the solutions are left to themselves for some time or when they are inspissated *in vacuo*. If a solution of the triphenylstibin sulfid be made in alcoholic ammonium sulfid in such a manner that there remains sulfid still undissolved an excess of ammonium sulfid is avoided. If this solution be filtered and allowed to decompose by being left to itself, after the sulfur has been filtered off there is neither sulfureted hydrogen nor ammonium sulfid in it, as no cupric sulfid is precipitated by an addition of sulfate of copper, as already mentioned; but it has reducing properties since metallic silver is precipitated from an alcoholic solution of silver nitrate. The decomposed colorless solution separated from the sulfur, when inspissated in the vacuum exsiccator, as residue leaves pure triphenylstibin. Lastly, it may be stated that the yellow solutions containing the complex antimony compounds are at once decolorized when mixed with an alcoholic ammoniacal solution of stibin haloid, stibin sulfid being precipitated in this case.

The complex antimony compound distinguished by the above described properties consequently causes the second phase of the action of the sulfureted hydrogen commencing with the yellow coloration. In the following third phase of reaction the repeatedly described splitting off of triphenylstibin takes place. As follows from the above description of the course of the reaction, the individual phases of the action of the sulfureted hydrogen can be kept well apart. Consequently it is perfectly possible to use the reaction for producing triphenylstibin or triphenylstibin sulfid. In the former case the directions according to Michaelis and Reese (loc. cit. p. 42 ff.) are followed, the process being allowed to run through all three phases. For producing triphenylstibin sulfid the reaction is broken off after the first phase. For obtaining an almost quantitative yield I proceed as follows: 10 g. of the triphenylstibin haloid compound,—preferably the bromin compound is used as this can be made very conveniently (comp. Michaelis and Reese loc. cit. p. 50)—are dissolved at the temperature of the room in 160 ccms. of a cold-saturated alcoholic ammonia solution. The alcohol used for this cold saturated ammonia solution is absolute, about 99%. A uniform, purified current of sulfureted hydrogen is introduced into the filtered solution while constantly agitating. This introduction is continued until a quite weak yellow coloration is obtained which can be caused just to disappear by very violent shaking. The crystalline paste produced is sucked dry, washed with alcohol and dried on clay. The yield amount to approx. 6 g., *i. e.*, 80% of the theoretical amount. The almost perfectly pure product can be obtained in beautiful needles by recrystallizing from alcohol.

Instead of the bromin compounds, I can just as well proceed from the much cheaper chlorin compounds taking care that the solutions which contain the arylstibin compounds and from which the sulfid is obtained by introducing sulphureted hydrogen are as concentrated as possible. For this purpose I proceed in such manner that the haloid compounds, that is to say the arylstibin chlorids, are decomposed with much less saturated alcoholic ammonia solution and at the boiling point.

In the case of triphenylstibin chlorid I pour over 10 g. of this compound 70 ccms. of the alcoholic ammonia solution, boil for one hour in a flask with a return condenser, leave it to itself approx. two hours, filter off the precipitated ammonium chlorid, and introduce sulfureted hydrogen into the now clear solution. The remainder of the process corresponds exactly to that described above. The yield here also is approx. 80 % of the theoretical amount. Moreover the sulfid can be made in analogous manner, also contrary to the statements of Michaelis and Reese (*loc. cit.* p. 53), by adding alcoholic ammonium sulfid to the alcoholic ammoniacal solution of the bromid. Here also the precaution must be taken that an excess of ammonium sulfid causing the sulfid produced to be dissolved be avoided.

In spite of its near relation to antimony sulfid triphenylstibin sulfid is pure white in color. It melts exactly at 119° to 120° cent. and decomposes at approx. 200° cent. leaving a red residue. It dissolves readily in benzene, chloroform and glacial acetic acid, with more difficulty in alcohol (1 part in 120 parts absolute alcohol at ordinary temperature, in 100 parts at boiling temperature), and with great difficulty in ether and petrolether. When the solutions are heated for a somewhat long time a gradual decomposition into triphenylstibin and sulfur occurs. This can also be caused by the action of dilute acids, even acetic acid. It is yet to be remarked, that the sulfid is soluble neither in alcoholic ammonia nor in alcoholic sulfureted hydrogen, whereas it is very readily dissolved by an alcoholic solution of ammonium sulfid forming a yellow-red solution, the properties of which are described herein before.

The sulfur of the stibin sulfid compounds can be split off readily by metals, particularly by powdered copper.

When manufacturing the sulfids instead of the halogenized triphenylstibin also the halogen compounds of its homologues and their derivatives and instead of the halogenized products also the hydroxid compounds otherwise formed as intermediate products and generally speaking every organic stibin compound containing aromatic radicals and a group to be substituted by sulfur may be used as starting products. Instead of the sulfureted hydrogen another sulfur compound inclining to give off its sulfur may be employed.

Having now particularly described and ascertained the nature of my said invention and in what manner the same is to be performed, I declare that what I claim is:

1. A process of producing stibin sulfids containing aromatic radicals which consists in causing a sulfur compound to re-act on an organic stibin compound containing aromatic radicals and a group to be substituted by sulfur and avoiding excess of the sulfurizing compound.

2. A process of producing triarylstibin sulfids, consisting in reacting on a halogenized triarylstibin with sulfureted hydrogen, avoiding an excess of the hydrogen sulfid.

3. The herein described new compounds being sulfids of arylstibins of the following general formula:

$$Y_3SbS$$

in which $Y_3$ represents three aromatic radicals.

4. The herein described new compound, triphenylstibin sulfid of the following formula:

$$(C_6H_5)_3SbS,$$

the new compound being a white cristallic body melting at 119° to 120° Cent. easily soluble in benzene, chloroform and glacial acetic acid and being split up into triphenylstibin and sulfur on heating and by the action of diluted acids.

In testimony whereof I have hereunto set my hand in presence of two subscribing witnesses.

LUDWIG KAUFMANN.

Witnesses:
 HENRY HASPER,
 ARTHUR SCHROEDER.